US012387664B2

(12) United States Patent
Roh

(10) Patent No.: US 12,387,664 B2
(45) Date of Patent: Aug. 12, 2025

(54) DISPLAY DEVICE

(71) Applicant: Samsung Display Co., Ltd., Yongin-Si (KR)

(72) Inventor: Hyunsuk Roh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/746,265

(22) Filed: Jun. 18, 2024

(65) Prior Publication Data

US 2025/0104607 A1 Mar. 27, 2025

(30) Foreign Application Priority Data

Sep. 22, 2023 (KR) ........................ 10-2023-0126821

(51) Int. Cl.
*G09G 3/32* (2016.01)
*G09G 3/3266* (2016.01)
*G09G 3/3275* (2016.01)

(52) U.S. Cl.
CPC ............ *G09G 3/32* (2013.01); *G09G 3/3266* (2013.01); *G09G 3/3275* (2013.01); *G09G 2310/0267* (2013.01); *G09G 2310/0275* (2013.01); *G09G 2310/0286* (2013.01); *G09G 2310/08* (2013.01); *G09G 2330/028* (2013.01); *G09G 2380/02* (2013.01)

(58) Field of Classification Search
None
See application file for complete search history.

(56) References Cited

U.S. PATENT DOCUMENTS

| | | | |
|---|---|---|---|
| 9,075,472 B2 | 7/2015 | Park et al. | |
| 10,319,300 B2 * | 6/2019 | An | G09G 3/3266 |
| 10,672,097 B2 | 6/2020 | Bae et al. | |
| 2021/0407351 A1 * | 12/2021 | Huang | G11C 19/28 |
| 2023/0075430 A1 | 3/2023 | Kim et al. | |
| 2023/0335064 A1 | 10/2023 | Her et al. | |

FOREIGN PATENT DOCUMENTS

| | | |
|---|---|---|
| KR | 10-1872987 B1 | 7/2018 |
| KR | 10-2021-0154722 A | 12/2021 |
| KR | 10-2022-0105886 A | 7/2022 |
| KR | 10-2022-0129946 A | 9/2022 |
| KR | 10-2576961 B1 | 9/2023 |

* cited by examiner

*Primary Examiner* — Christopher J Kohlman
(74) *Attorney, Agent, or Firm* — Innovation Counsel LLP

(57) ABSTRACT

Disclosed is a display device which includes a first display panel that includes a first pixel and a first data line and is driven with a plurality of frames, a second display panel that includes a second pixel and a second data line and is driven with the plurality of frames, a driving controller and a data driver that controls the plurality of frames, and a signal transfer line that is electrically connected to the first data line, the second data line, and the data driver. The plurality of frames include a first frame and a second frame. During the first frame, the data driver outputs a first data signal to the signal transfer line. During the second frame, the data driver outputs a second data signal to the signal transfer line.

20 Claims, 8 Drawing Sheets

DISPLAY DEVICE

CROSS-REFERENCE TO RELATED APPLICATIONS

This application claims priority under 35 U.S.C. § 119 to Korean Patent Application No. 10-2023-0126821 filed on Sep. 22, 2023, in the Korean Intellectual Property Office, the disclosures of which are incorporated by reference herein in their entireties.

BACKGROUND

Embodiments of the present disclosure described herein relate to a display device driving a plurality of display panels with one timing controller embedded driver.

As the mobile communication technology develops, nowadays, an electronic device is being transformed to freely access wired and wireless networks. For example, portable display devices such as a smartphone and a tablet PC may support various functions such as Internet access and multimedia content playback in addition to a function of sending and receiving calls and messages.

As such, a display device that is implemented in various shapes may generally include a display panel and may visually provide various contents (e.g., an image, a video, etc.) to the user through the display panel. The display device includes a display driving circuit (e.g., a timing controller embedded driver (TED)) for driving the display panel.

SUMMARY

Embodiments of the present disclosure provide a display device driving a plurality of display panels with one timing controller embedded driver.

According to an embodiment, a display device may include a first display panel that includes a first pixel and a first data line and is driven with a plurality of frames, a second display panel that includes a second pixel and a second data line, is spaced apart from the first display panel, and is driven with the plurality of frames, a driving controller and a data driver that drives the first display panel and the second display panel and controls the plurality of frames, and a signal transfer line that is electrically connected to the first data line, the second data line, and the data driver. The plurality of frames may include a first frame and a second frame different from the first frame. During the first frame, the data driver may output a first data signal which drives the first display panel to the signal transfer line. During the second frame, the data driver may output a second data signal which drives the second display panel to the signal transfer line.

The first display panel and the second display panel may face each other.

The driving controller and the data driver may be disposed between the first display panel and the second display panel.

The driving controller and the data driver are disposed on a flexible circuit board.

The first display panel may include a first scan driver outputting a first scan signal during the first frame, and the second display panel may include a second scan driver outputting a second scan signal different from the first scan signal during the second frame.

The first display panel may provide the first data signal to the first pixel, the first pixel may emit a light based on the first scan signal and the first data signal, the second display panel may provide the second data signal to the second pixel, and the second pixel may emit a light based on the second scan signal and the second data signal.

The first scan driver may include a plurality of first shift registers which sequentially operate, the second scan driver may include a plurality of second shift registers which sequentially operate, and the driving controller may provide a first scan start signal to a 1-1st shift register among the plurality of first shift registers and may provide a second scan start signal different from the first scan start signal to a 1-2nd shift register among the plurality of second shift registers.

The first scan driver may output the first scan signal based on the first scan start signal, and the second scan driver may output the second scan signal based on the second scan start signal.

The first scan start signal and the second scan start signal may not overlap each other.

The display device may further include a voltage generator that receives a voltage control signal from the driving controller and controls an on/off state of each of the first display panel and the second display panel based on the voltage control signal.

The driving controller may drive the first display panel and the second display panel in one of a first mode, a second mode, and a third mode. In the first mode, the first display panel may be turned on, the second display panel may be turned off, and the driving controller may drive at least one frame among the plurality of frames as the first frame.

In the second mode, the first display panel may be turned off, the second display panel may be turned on, and the driving controller may drive at least one frame among the plurality of frames as the second frame.

In the third mode, the first display panel may be turned on, the second display panel may be turned on, the driving controller may drive the first display panel and the second display panel with the first frame and the second frame, respectively, and the first frame and the second frame may be alternately provided.

In the third mode, a driving frequency of the first display panel may be identical to a driving frequency of the second display panel.

The first data signal and the second data signal may be respectively provided to the first display panel and the second display panel through the signal transfer line.

An area of the first display panel may be wider than an area of the second display panel.

The display device may further include a third display panel that includes a third pixel and a third data line, is spaced apart from the first display panel and the second display panel, and is driven with the plurality of frames, the driving controller further may drive the third display panel, the signal transfer line may be further electrically connected to the third data line, the plurality of frames may further include a third frame different from the first frame and the second frame, and during the third frame, the data driver may output a third data signal driving the third display panel to the signal transfer line.

The first display panel and the third display panel may face each other.

The first data signal, the second data signal, and the third data signal may be respectively provided to the first display panel, the second display panel, and the third display panel through the signal transfer line.

An area of the second display panel may be wider than an area of the third display panel.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
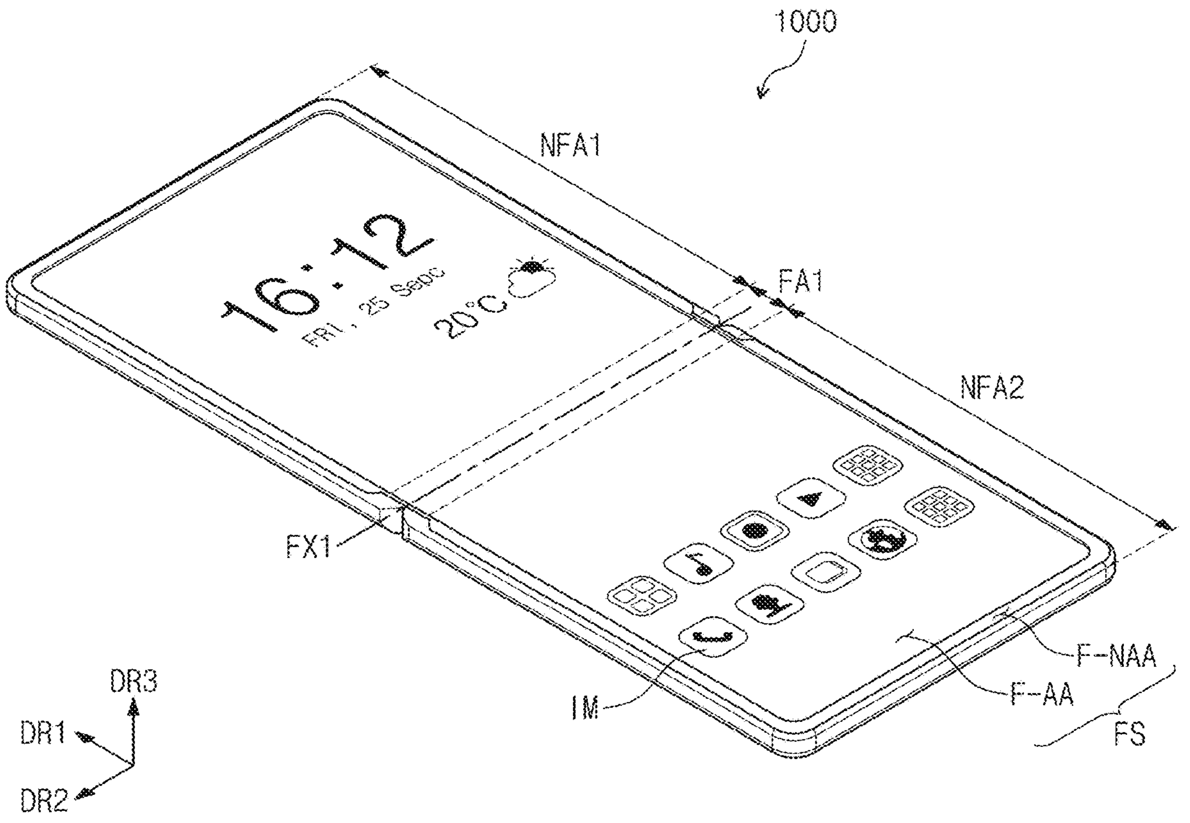
FIG. 1 is a perspective view illustrating a state where a display device is unfolded according to an embodiment of the present disclosure.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

Figure 2:
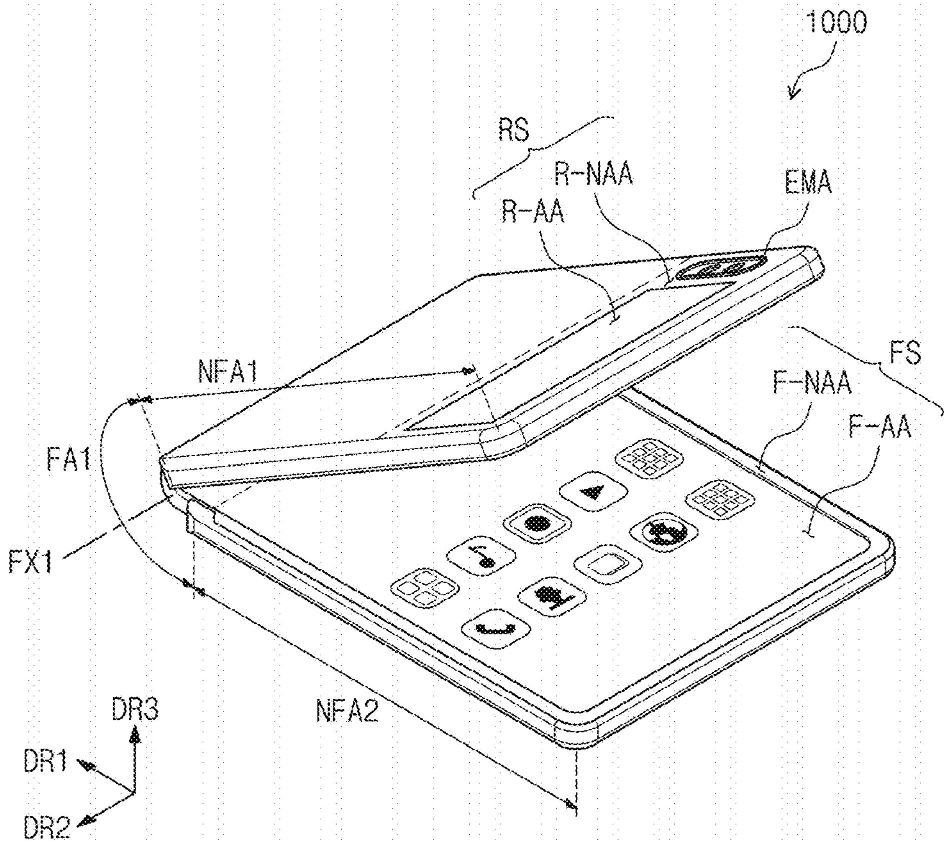
FIG. 2 is a perspective view illustrating how a display device illustrated in FIG. 1 is folded.

FIG. 1 is a perspective view illustrating a state where a display device is unfolded according to an embodiment of the present disclosure. FIG. 2 is a perspective view illustrating how a display device illustrated in FIG. 1 is folded.

Referring to FIGS. 1 and 2, a display device 1000 may be a device that is activated in response to an electrical signal. For example, the display device 1000 may be a mobile phone, a tablet, a car navigation system, a game console, or a wearable device, but the present disclosure is not limited thereto. An example in which the display device 1000 is a smartphone is illustrated in the specification of the present disclosure.

The display device 1000 may include a first display surface FS that is defined in a plane formed by a first direction DR1 and a second direction DR2 intersecting the first direction DR1. The display device 1000 may provide an image IM to the user through the first display surface FS. The image IM may include a still image as well as a video (or a moving image). A clock window and icons are illustrated in FIG. 1 as an example of the image IM. The display device 1000 may display the image IM on the first display surface FS parallel to each of the first direction DR1 and the second direction DR2 so as to face a third direction DR3. A front surface (or an upper/top surface) and a rear surface (or a lower/bottom surface) of each of components may be defined with respect to a direction in which the image IM is displayed. The front surface and the rear surface may be opposite to each other in the third direction DR3, and the normal direction of each of the front surface and the rear surface may be parallel to the third direction DR3.

The first display surface FS may include a first active area F-AA and a first surrounding area F-NAA. Various types of external inputs may be sensed in the first active area F-AA. The first surrounding area F-NAA may be disposed adjacent to the first active area F-AA. The first surrounding area F-NAA may have a given color. The first surrounding area F-NAA may surround the first active area F-AA. As such, the shape of the first active area F-AA may be defined substantially by the first surrounding area F-NAA. However, this is illustrated as an example, and the first surrounding area F-NAA may be disposed adjacent to only one side of the first active area F-AA or may be omitted. The display device 1000 according to an embodiment of the present disclosure may include various shapes of active areas and the shapes of the active areas are not limited to any one embodiment.

The display device 1000 may include a second display surface RS. The second display surface RS may be defined as a surface that is opposite to (or faces away from) at least a portion of the first display surface FS. That is, the second display surface RS may be defined as a portion of the rear surface of the display device 1000. In an in-folded state, the second display surface RS may be visually perceived by the user.

The second display surface RS may include a second active area R-AA and a second surrounding area R-NAA. An electronic module area EMA may overlap the second active area R-AA in a plan view. The display device 1000 may provide the image IM through the second active area R-AA. Also, various types of external inputs may be sensed through the second active area R-AA. The second surrounding area R-NAA may be disposed adjacent to the second active area R-AA. The second surrounding area R-NAA may have a given color. The second surrounding area R-NAA may surround the second active area R-AA. As such, the shape of the second active area R-AA may be defined substantially by the second surrounding area R-NAA. However, this is illustrated as an example, and the second surrounding area R-NAA may be disposed adjacent to only one side of the second active area R-AA or may be omitted. The display device 1000 according to an embodiment of the present disclosure may include various shapes of active areas and the shapes of the active areas are not limited to any one embodiment.

Various electronic modules may be disposed to overlap the electronic module area EMA. For example, the electronic module may include at least one of a camera, a speaker, a light sensor, and a thermal sensor. The electronic module area EMA may sense an external subject through the first or second display surface FS or RS or may provide a sound signal, such as a voice, to the outside through the first or second display surface FS or RS. The electronic module may include a plurality of components and the plurality of components are not limited to any one embodiment.

The electronic module area EMA may be surrounded by the second active area R-AA and the second surrounding area R-NAA. However, the present disclosure is not limited thereto. For example, the electronic module area EMA may be disposed to overlap the second active area R-AA and is not limited to any one embodiment.

The display device 1000 may sense an external input applied from the outside. The external input may include various types of inputs that are provided from the outside of the display device 1000. For example, as well as a contact by a part of the user's body such as the user's hand, the external input may include an external input that is applied in a state of being close to the display device 1000 or in a state of being adjacent to the display device 1000 within a given distance. In addition, the external input may be provided in various types such as force, pressure, temperature, and light.

Meanwhile, in FIG. 1 and the following drawings, the first direction DR1 to the third direction DR3 are illustrated, and directions indicated by the first to third directions DR1, DR2, and DR3 described in the specification may be provided as the relative concept and may be changed to different directions. Also, the directions indicated by the first to third directions DR1, DR2, and DR3 may be described as first to third directions, and the same reference signs may be used.

The display device 1000 may include at least one folding area FA1 and non-folding areas NFA1 and NFA2 disposed adjacent to the folding area FA1. The non-folding areas NFA1 and NFA2 may be disposed to be spaced from each other with the folding area FA1 interposed therebetween. The non-folding areas NFA1 and NFA2 may include the first non-folding area NFA1 and the second non-folding area NFA2. For example, the first non-folding area NFA1 may be disposed on one side of the folding area FA1 along the first direction DR1, and the second non-folding area NFA2 may be spaced from the first non-folding area NFA1 and may be disposed on an opposite side of the folding area FA1 along an opposite direction of the first direction DR1.

The display device 1000 may be folded about a folding axis FX1. The folding axis FX1 may be a virtual axis extending in the second direction DR2. The folding axis FX1 may be parallel to a short side direction of the display device 1000. The folding axis FX1 may extend on the first display surface FS along the second direction DR2.

In an embodiment, the first non-folding area NFA1 and the second non-folding area NFA2 may face each other when the display device 1000 is inner-folded such that the first display surface FS is not exposed to the outside.

Also, unlike the example illustrated, in an embodiment, the display device 1000 may be outer-folded such that the first display surface FS is exposed to the outside. Meanwhile, in an embodiment, the first display surface FS may be visually perceived by the user when the display device 1000 is unfolded. The second display surface RS may be visually perceived by the user when the display device 1000 is folded.

Figure 3:
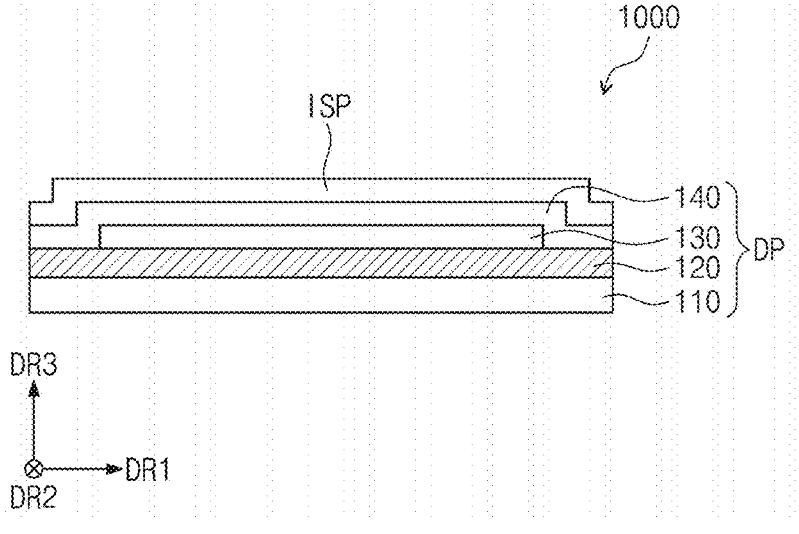
FIG. 3 is a cross-sectional view of a display panel and a sensor panel according to an embodiment of the present disclosure.

FIG. 3 is a cross-sectional view of a display panel and a sensor panel according to an embodiment of the present disclosure.

Referring to FIG. 3, the display device 1000 may include a display panel DP and a sensor panel ISP. The display panel DP may include a base layer 110, a circuit layer 120, a light emitting element layer 130, and an encapsulation layer 140.

The base layer 110 may be a member that provides a base surface on which the circuit layer 120 is disposed. The base layer 110 may be a glass substrate, a metal substrate, or a polymer substrate. However, the present disclosure is not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a "base barrier layer".

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. Meanwhile, in the specification, the wording "~~-based resin" indicates that "~~-based resin" includes the functional group of "~~".

The circuit layer 120 may be disposed on the base layer 110. The circuit layer 120 may include an insulating layer, a semiconductor pattern, a conductive pattern, a signal line, etc. An insulating layer, a semiconductor layer, and a conductive layer may be formed on the base layer 110 by a coating or deposition process, and the insulating layer, the semiconductor layer, and the conductive layer may then be selectively patterned through a plurality of photolithographic processes to form the insulating layer, the semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from foreign substances such as moisture, oxygen, and dust particles.

The sensor panel ISP may be formed on the display panel DP through processes the same as the processes forming the display panel DP. In this case, the sensor panel ISP may be expressed as being directly disposed on the display panel DP. The expression "being directly disposed" may mean that a third component is not disposed between the sensor panel ISP and the display panel DP. That is, a separate adhesive member may not be disposed between the sensor panel ISP and the display panel DP. Alternatively, the sensor panel ISP may be coupled to the display panel DP through an adhesive member. The adhesive member may include a typical adhesive or sticking agent.

Figure 4:
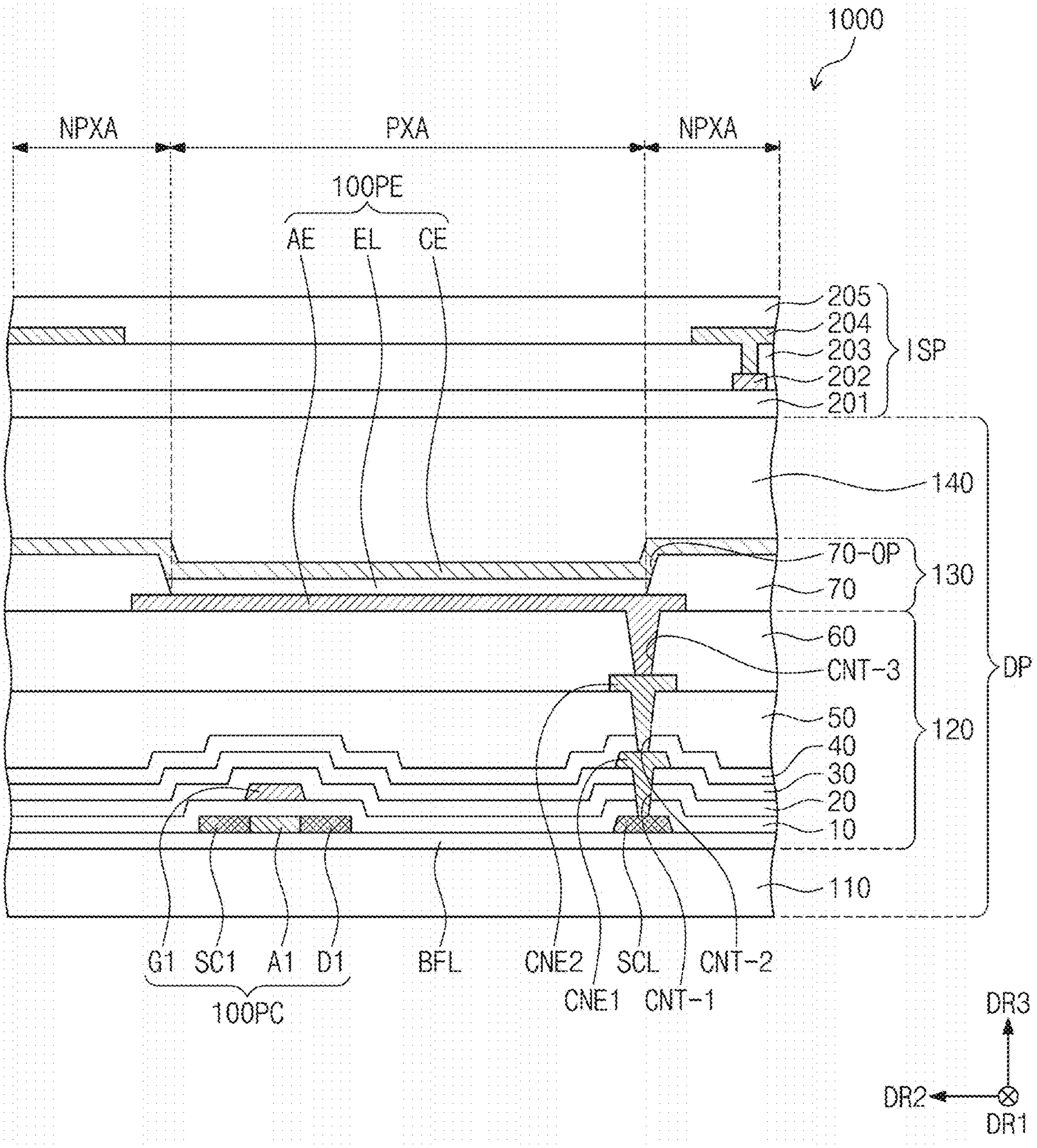
FIG. 4 is a cross-sectional view of a display panel and a sensor panel according to an embodiment of the present disclosure.

FIG. 4 is a cross-sectional view of a display panel and a sensor panel according to an embodiment of the present disclosure. In the description of FIG. 4, the components that are described with reference to FIG. 3 are marked by the same reference numerals/signs, and thus, additional description will be omitted to avoid redundancy.

Referring to FIG. 4, at least one inorganic layer may be formed on an upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In this embodiment, the display panel DP is illustrated as including a buffer layer BFL.

The buffer layer BFL may improve a bonding force between the base layer 110 and a semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern may include polysilicon. However, the present disclosure is not limited thereto. For example, the semiconductor pattern may include amorphous silicon, low-temperature polycrystalline silicon, or oxide semiconductor.

FIG. 4 shows only a portion of the semiconductor pattern, and the semiconductor pattern may be further disposed in another area. Semiconductor patterns may be arranged across pixels in a specific rule. An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a concentration lower than that of the first area.

A conductivity of the first area may be greater than a conductivity of the second area and may substantially serves as an electrode or a signal line. The second area may correspond to an active (or channel) of a transistor substantially. In other words, a portion of the semiconductor pattern may be an active of a transistor, another portion thereof may be a source or a drain of the transistor, and the other portion thereof may be a connection electrode or a connection signal line.

Each of pixels may have an equivalent circuit including 7 transistors, one capacitor, and a light emitting element. The equivalent circuit of the pixel may be modified in various forms. One transistor 100PC and one light emitting element 100PE that are included in the pixel are illustrated in FIG. 4 as an example.

The transistor 100PC may include a source SC1, an active A1, a drain D1, and a gate G1. The source SC1, the active A1, and the drain D1 may be formed of the semiconductor pattern. In a cross-sectional view, the source SC1 and the drain D1 may extend from the active A1 in directions facing away from each other. A portion of a connection signal line SCL formed of the semiconductor pattern is illustrated in FIG. 4. Although not separately illustrated, the connection signal line SCL may be connected to the drain D1 of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer and may have a single-layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. As well as the first insulating layer 10, an insulating layer of the circuit layer 120 to be described later may be an inorganic layer and/or an organic layer and may have a single-layer or multilayer structure. The inorganic layer may include at least one of the above materials, but the present disclosure is not limited thereto.

The gate G1 is disposed on the first insulating layer 10. The gate G1 may be a portion of a metal pattern. The gate G1 may overlap the active A1. The gate G1 may function as a self-aligned mask in the process of doping the semiconductor pattern.

A second insulating layer 20 may be disposed on the first insulating layer 10 and may cover the gate G1. The second insulating layer 20 may overlap the pixels in common. The second insulating layer 20 may be an inorganic layer and/or an organic layer and may have a single-layer or multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 formed through the first, second, and third insulating layers 10, 20, and 30.

A fourth insulating layer 40 may be disposed on the first connection electrode CNE1 on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 formed through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120 on the sixth insulating layer 60. The light emitting element layer 130 may include the light emitting element 100PE. For example, the light emitting element layer 130 may be an organic light emitting material, a quantum dot, a quantum rod, a micro LED, or a nano LED. Hereinafter, the description will be given under the condition that the light emitting element 100PE is an organic light emitting element, but the present disclosure is not limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 formed through the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

Each of the first active area F-AA (refer to FIG. 1) and the second active area R-AA (refer to FIG. 2) may include a light emitting area PXA and a non-light emitting area NPXA disposed adjacent to the light emitting area PXA. The non-light emitting area NPXA may surround the light emitting area PXA. In an embodiment, the light emitting area PXA is defined to correspond to a partial area of the first electrode AE exposed by the opening 70-OP.

The light emitting layer EL may be disposed on the first electrode AE. The light emitting layer EL may be disposed in the opening 70-OP. That is, the light emitting layer EL may be independently formed for each pixel. When the light emitting layer EL is independently formed for each pixel, each of the light emitting layers EL may emit a light of at least one of a blue color, a red color, and a green color. However, the present disclosure is not limited thereto. For example, the light emitting layer EL may be connected to the pixels in common. In this case, the light emitting layer EL may provide a blue light or may provide a white light.

The second electrode CE may be disposed on the light emitting layer EL. The second electrode CE may have an integrated shape and may be disposed in the plurality pixels in common.

Although not illustrated, a hole control layer may be disposed between the first electrode AE and the light emitting layer EL. The hole control layer may be disposed in common in the light emitting area PXA and the non-light emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be formed in common in the plurality of pixels by using an open mask.

The encapsulation layer 140 may be disposed on the light emitting element layer 130. The encapsulation layer 140 may include an inorganic layer, an organic layer, and an inorganic layer sequentially stacked, and layers constituting the encapsulation layer 140 are not limited thereto.

The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the present disclosure is not limited thereto.

The sensor panel ISP may include a base insulating layer 201, a first conductive layer 202, a sensing insulating layer 203, a second conductive layer 204, and a cover insulating layer 205.

The base insulating layer 201 may be an inorganic layer including at least one of silicon nitride, silicon oxynitride, and silicon oxide. Alternatively, the base insulating layer 201 may be an organic layer including an epoxy resin, an acrylic resin, or an imide-based resin. The base insulating layer 201 may have a single-layer structure or may be a structure in which a plurality of layers are stacked along the third direction DR3.

Each of the first conductive layer 202 and the second conductive layer 204 may have a single-layer structure or may have a structure in which a plurality of layers are stacked in the third direction DR3.

A conductive layer of a single-layer structure may include a metal layer or a transparent conductive layer. The metal layer may include molybdenum, silver, titanium, copper, aluminum, or alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, graphene, etc.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. The inorganic layer may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. The organic layer may include at least one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

Figure 5:
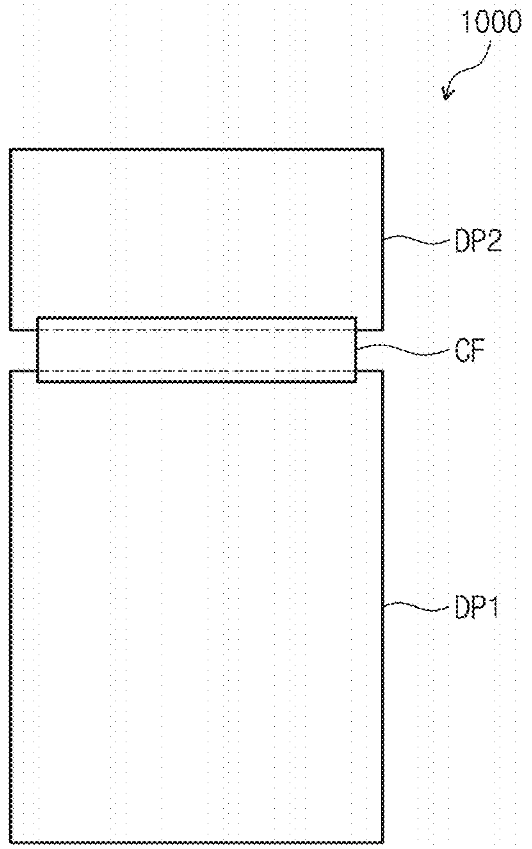
FIG. 5 is a diagram for describing a schematic structure of a display device according to an embodiment of the present disclosure.
Figure 6:
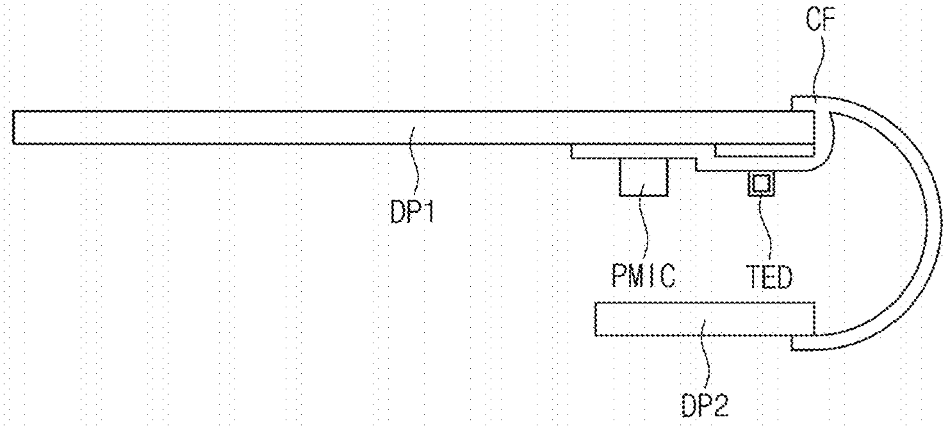
FIG. 6 is a side view of a display device according to an embodiment of the present disclosure.

FIG. 5 is a diagram for describing a schematic structure of a display device according to an embodiment of the present disclosure. FIG. 6 is a side view of a display device according to an embodiment of the present disclosure.

Referring to FIGS. 5 and 6, the display device 1000 may include a flexible circuit board CF, a timing controller embedded driver TED, a voltage generator PMIC, a first display panel DP1, and a second display panel DP2.

The first display panel DP1 and the second display panel DP2 may correspond to the display panel DP (refer to FIG. 4).

The first display panel DP1 may overlap the first display surface FS (refer to FIG. 1). That is, a first effective area AA1 (refer to FIG. 7) of the first display panel DP1 may correspond to the first display surface FS (refer to FIG. 1).

The second display panel DP2 may overlap the second display surface RS (refer to FIG. 2). That is, a second effective area AA2 (refer to FIG. 7) of the second display panel DP2 may correspond to the second display surface RS (refer to FIG. 2).

The second display panel DP2 may be disposed to be spaced from the first display panel DP1. The area of the first display panel DP1 may be wider than the area of the second display panel DP2.

The flexible circuit board CF according to an embodiment of the present disclosure may include a flexible printed circuit board (FPCB).

The timing controller embedded driver TED and the voltage generator PMIC may be mounted on the flexible circuit board CF. For example, the timing controller embedded driver TED and the voltage generator PMIC may be disposed on the flexible circuit board CF in the form of a chip on film (COF). The flexible circuit board CF may be electrically connected to the first display panel DP1 and the second display panel DP2. The timing controller embedded driver TED may drive the first display panel DP1 and the second display panel DP2. The voltage generator PMIC may control an on/off state of each of the first display panel DP1 and the second display panel DP2. As the flexible circuit board CF is bent, the first display panel DP1 and the second display panel DP2 may overlap each other, and the timing controller embedded driver TED may be disposed between the first display panel DP1 and the second display panel DP2.

Figure 7:
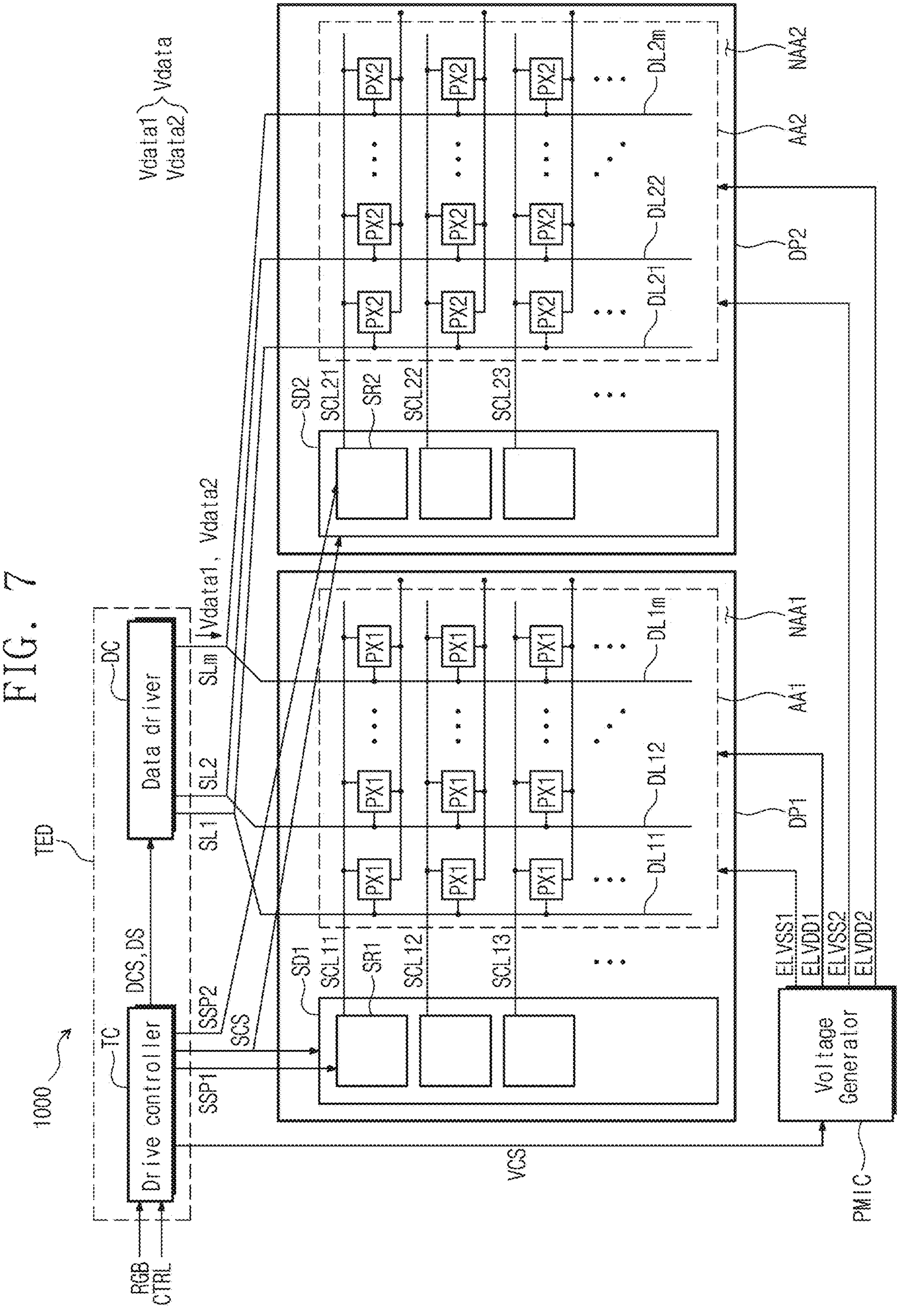
FIG. 7 is a block diagram of a display device according to an embodiment of the present disclosure.

FIG. 7 is a block diagram of a display device according to an embodiment of the present disclosure.

Referring to FIG. 7, the display device 1000 may include the timing controller embedded driver TED, the voltage generator PMIC, the first display panel DP1, and the second display panel DP2. The timing controller embedded driver TED may include a drive controller TC and a data driver DC.

The drive controller TC may receive an image signal RGB and a control signal CTRL from a main controller (e.g., a micro controller). The drive controller TC may adjust a gray level of the image signal RGB to output an image data signal DS. The first display panel DP1 and the second display panel DP2 may be driven based on the image data signal DS.

The drive controller TC may generate a scan control signal SCS, a first scan start signal SSP1, a second scan start signal SSP2, and a data control signal DCS. The drive controller TC may output a voltage control signal VCS for controlling the voltage generator PMIC. The drive controller TC may control the data driver DC based on the data control signal DCS.

The data driver DC may receive the data control signal DCS and the image data signal DS from the drive controller TC. The data driver DC may convert the image data signal DS into a data signal Vdata. The data signal Vdata may include a first data signal Vdata1 and a second data signal Vdata2. The data driver DC outputs the first data signal Vdata1 and the second data signal Vdata2 to a plurality of signal transfer lines SL1 and SL2 to SLm (m being a natural number greater than 1). Each of the first data signal Vdata1 and the second data signal Vdata2 may be an analog voltage corresponding to a gray value of the image data signal DS.

The data driver DC may provide the first data signal Vdata1 and the second data signal Vdata2 to a plurality of first data lines DL11 and DL12 to DL1*m* electrically connected to the first display panel DP1 and a plurality of second data lines DL21 and DL22 to DL2*m* electrically connected to the second display panel DP2 through the signal transfer lines SL1 and SL2 to SLm. That is, the first display panel DP1 and the second display panel DP2 may share the plurality of signal transfer lines SL1 and SL2 to SLm, and the first data signal Vdata1 and the second data signal Vdata2 may be respectively provided to the first display panel DP1 and the second display panel DP2 through the signal transfer lines SL1 and SL2 to SLm.

The plurality of signal transfer lines SL1 and SL2 to SLm may be electrically connected to the plurality of first data lines DL11 and DL12 to DL1*m*, respectively, and may be electrically connected to the plurality of second data lines DL21 and DL22 to DL2*m*, respectively. That is, each of the plurality of signal transfer lines SL1 and SL2 to SLm may be connected to a respective first data line and a respective second data lines.

Each of the first display panel DP1 and the second display panel DP2 may be electrically connected to the drive controller TC, the data driver DC, and the voltage generator PMIC.

The first display panel DP1 may include a first scan driver SD1, a plurality of first scan lines SCL11, SCL12, and SCL13, the plurality of first data lines DL11 and DL12 to DL1*m*, and a plurality of first pixels PX1, and the second display panel DP2 may include a second scan driver SD2, a plurality of second scan lines SCL21, SCL22, and SCL23, the plurality of second data lines DL21 and DL22 to DL2*m*, and a plurality of second pixels PX2.

The first scan driver SD1 and the second scan driver SD2 may receive the scan control signal SCS from the drive controller TC. The scan control signal SCS may include a clock signal that is provided to each of a plurality of shift registers included in each of the first scan driver SD1 and the second scan driver SD2. Also, the scan control signal SCS may provide a gate high voltage (referred to as "VGH") and a gate low voltage (referred to as "VGL") to the first scan driver SD1 and the second scan driver SD2. The gate high voltage may refer to a high voltage of a gate signal and the gate low voltage may refer to a low voltage of the gate signal. The scan control signal SCS may be provided in common to the first scan driver SD1 and the second scan driver SD2.

The first scan driver SD1 may receive the first scan start signal SSP1 from the drive controller TC. The second scan driver SD2 may receive the second scan start signal SSP2 from the drive controller TC.

The first scan driver SD1 may include a plurality of first shift registers SR1 for sequential driving. Three first shift registers SR1 are illustrated in FIG. 7 as an example, but the number of first shift registers according to an embodiment of the present disclosure is not limited thereto. For example, the number of first shift registers SR1 may be appropriately provided depending on the size of the area of the first effective area AA1. The number of first shift registers SR1 may be the same as the plurality of first data lines SCL1.

The drive controller TC may provide the first scan start signal SSP1 and a 1-1st clock signal to the 1-1st shift register among the plurality of first shift registers SR1. The 1-1st shift register may receive the first scan start signal SSP1 as a carry signal. When the first scan start signal SSP1 and the scan control signal SCS are provided to the 1-1st shift register, the 1-1st shift register may provide a 1-1st scan signal to the first pixels PX1 connected to the first scan line SCL11 through the first scan line SCL11.

A 2-1st shift register among the plurality of first shift registers SR1 may be connected to the 1-1st shift register. The 2-1st shift register may receive the 1-1st scan signal as a carry signal. When the 1-1st scan signal and a 2-1st clock signal are provided to the 2-1st shift register, the 2-1st shift register may provide a 1-2nd scan signal to the first pixels PX1 connected to the first scan line SCL12 through the first scan line SCL12.

A 3-1st shift register among the plurality of first shift registers SR1 may be connected to the 2-1st shift register. The 3-1st shift register may receive the 1-2nd scan signal as a carry signal. When the 1-2nd scan signal and a 3-1st clock signal are provided to the 3-1st shift register, the 3-1st shift register may provide a 1-3rd scan signal to the first pixels PX1 connected to the first scan line SCL13 through the first scan line SCL13.

That is, the first scan driver SD1 may sequentially output a plurality of first scan signals to the plurality of first scan lines SCL11 to SCL13 in response to the scan control signal SCS and the first scan start signal SSP1. The first scan driver SD1 may operate depending on whether the first scan start signal SSP1 is provided.

The second scan driver SD2 may include a plurality of second shift registers SR2 for sequential driving. Three second shift registers SR2 are illustrated in FIG. 7 as an example, but the number of second shift registers according to an embodiment of the present disclosure is not limited thereto. For example, the number of second shift registers SR2 may be appropriately provided depending on the size of the area of the second effective area AA2. The number of second shift registers SR2 may be the same as the number of the plurality of second data lines SCL2. An example in which the number of first shift registers SR1 and the number of second shift registers SR2 are equal is illustrated in FIG. 7. However, the area of the first effective area AA1 according to an embodiment of the present disclosure may be larger than the area of the second shift registers SR2, and thus, the number of first shift registers SR1 may be more than the number of second shift registers SR2.

The drive controller TC may provide the second scan start signal SSP2 and a 1-2nd clock signal to the 1-2nd shift register among the plurality of second shift registers SR2. The 1-2nd shift register may receive the second scan start signal SSP2 as a carry signal. When the second scan start signal SSP2 and the scan control signal SCS are provided to the 1-2nd shift register, the 1-2nd shift register may provide a 2-1st scan signal to the second pixels PX2 connected to the second scan line SCL21 through the second scan line SCL21.

A 2-2nd shift register among the plurality of second shift registers SR2 may be connected to the 1-2nd shift register. The 2-2nd shift register may receive the 2-1st scan signal as a carry signal. When the 2-1st scan signal and a 2-2nd clock signal are provided to the 2-2nd shift register, the 2-2nd shift register may provide a 2-2nd scan signal to the second pixels connected to the second scan line SCL22 PX2 through the second scan line SCL22.

A 3-2nd shift register among the plurality of second shift registers SR2 may be connected to the 2-2nd shift register. The 3-2nd shift register may receive the 2-2nd scan signal as a carry signal. When the 2-2nd scan signal and a 3-2nd clock signal are provided to the 3-2nd shift register, the 3-2nd shift register may provide a 2-3rd scan signal to the second pixels PX2 connected to the second scan line SCL23 through the second scan line SCL23. The 1-2nd clock signal, the 2-2nd clock signal, and the 3-2nd clock signal may be the same clock signal, but the present disclosure is not limited thereto. For example, the 1-2nd clock signal, the 2-2nd clock signal, and the 3-2nd clock signal may be different signals.

That is, the second scan driver SD2 may sequentially output a plurality of second scan signals to the plurality of second scan lines SCL21 to SCL23 in response to the scan control signal SCS and the second scan start signal SSP2. The second scan driver SD2 may operate depending on whether the second scan start signal SSP2 is provided.

The data driver DC may provide the first data signal Vdata1 to the first pixels PX1 disposed in the first display panel DP1. The first data signal Vdata1 may be transferred to the first display panel DP1 through the plurality of first data lines DL11 and DL12 to DL1*m*.

The first pixel PX1 may emit light based on the first scan signal and the first data signal Vdata1.

The data driver DC may provide the second data signal Vdata2 to the second pixels PX2 disposed in the second display panel DP2. The second data signal Vdata2 may be transferred to the second display panel DP2 through the plurality of second data lines DL21 and DL22 to DL2*m*.

The second pixel PX2 may emit light based on the second scan signal and the second data signal Vdata2.

According to the present disclosure, the first data signal Vdata1 and the second data signal Vdata2 may be provided to the first display panel DP1 and the second display panel DP2 through the plurality of signal transfer lines SL1 and SL2 to SLm. As such, the first data signal Vdata1 may be simultaneously provided to the first display panel DP1 and the second display panel DP2. In this case, even though the first data signal Vdata1 is provided to the second display panel DP2, the second pixel PX2 may not emit light corresponding to the first data signal Vdata1 by controlling the second scan driver SD2 by using the second scan start signal SSP2 such that the plurality of second scan signals are not provided to the second display panel DP2. That is, the second display panel DP2 may not provide an image corresponding to the first data signal Vdata1. In other words, the display device 1000 may easily drive the plurality of display panels DP1 and DP2 by using one timing controller embedded driver TED. Accordingly, the inner space of the display device 1000 may be saved.

Also, according to the present disclosure, the second data signal Vdata2 may be simultaneously provided to the first display panel DP1 and the second display panel DP2. In this case, even though the second data signal Vdata2 is provided to the first display panel DP1, the first pixel PX1 may not emit light corresponding to the second data signal Vdata2 by controlling the first scan driver SD1 by using the first scan start signal SSP1 such that the plurality of first scan signals are not provided to the first display panel DP1. In other words, the display device 1000 may easily drive the plurality of display panels DP1 and DP2 by using one timing controller embedded driver TED.

The first display panel DP1 may include the first effective area AA1 and a first non-effective area NAA1. The first effective area AA1 may overlap the first active area F-AA (refer to FIG. 1) and the first non-effective area NAA1 may overlap the first surrounding area F-NAA (refer to FIG. 1). The first pixel PX1 may be disposed in the first effective area AA1, and the first scan driver SD1 may be disposed in the first non-effective area NAA1.

The second display panel DP2 may include the second effective area AA2 and a second non-effective area NAA2. The second effective area AA2 may overlap the second active area R-AA (refer to FIG. 2), and the second non-effective area NAA2 may overlap the second surrounding area R-NAA (refer to FIG. 2). The second pixel PX2 may be disposed in the second effective area AA2 and the second scan driver SD2 may be disposed in the second non-effective area NAA2.

The voltage generator PMIC may receive the voltage control signal VCS from the drive controller TC. The voltage generator PMIC may generate voltages necessary for operations of the first display panel DP1 and the second display panel DP2 based on the voltage control signal VCS. In an embodiment of the present disclosure, the voltage generator PMIC may generate a first driving voltage ELVDD1 and a first power supply voltage ELVSS1 necessary for the operation of the first display panel DP1 and may generate a second driving voltage ELVDD2 and a second power supply voltage ELVSS2 necessary for the operation of the second display panel DP2.

When the voltage generator PMIC provides the first driving voltage ELVDD1 and the first power supply voltage ELVSS1 to the first display panel DP1, the first display panel DP1 may be in an on state. When the voltage generator PMIC provides the second driving voltage ELVDD2 and the second power supply voltage ELVSS2 to the second display panel DP2, the second display panel DP2 may be in an on state.

When the voltage generator PMIC does not provide the first driving voltage ELVDD1 and the first power supply voltage ELVSS1 to the first display panel DP1, the first display panel DP1 may be in an off state. When the voltage generator PMIC does not provide the second driving voltage ELVDD2 and the second power supply voltage ELVSS2 to the second display panel DP2, the second display panel DP2 may be in an off state. That is, the voltage generator PMIC may control the on/off state of each of the first display panel DP1 and the second display panel DP2 based on the voltage control signal VCS.

Figure 8:
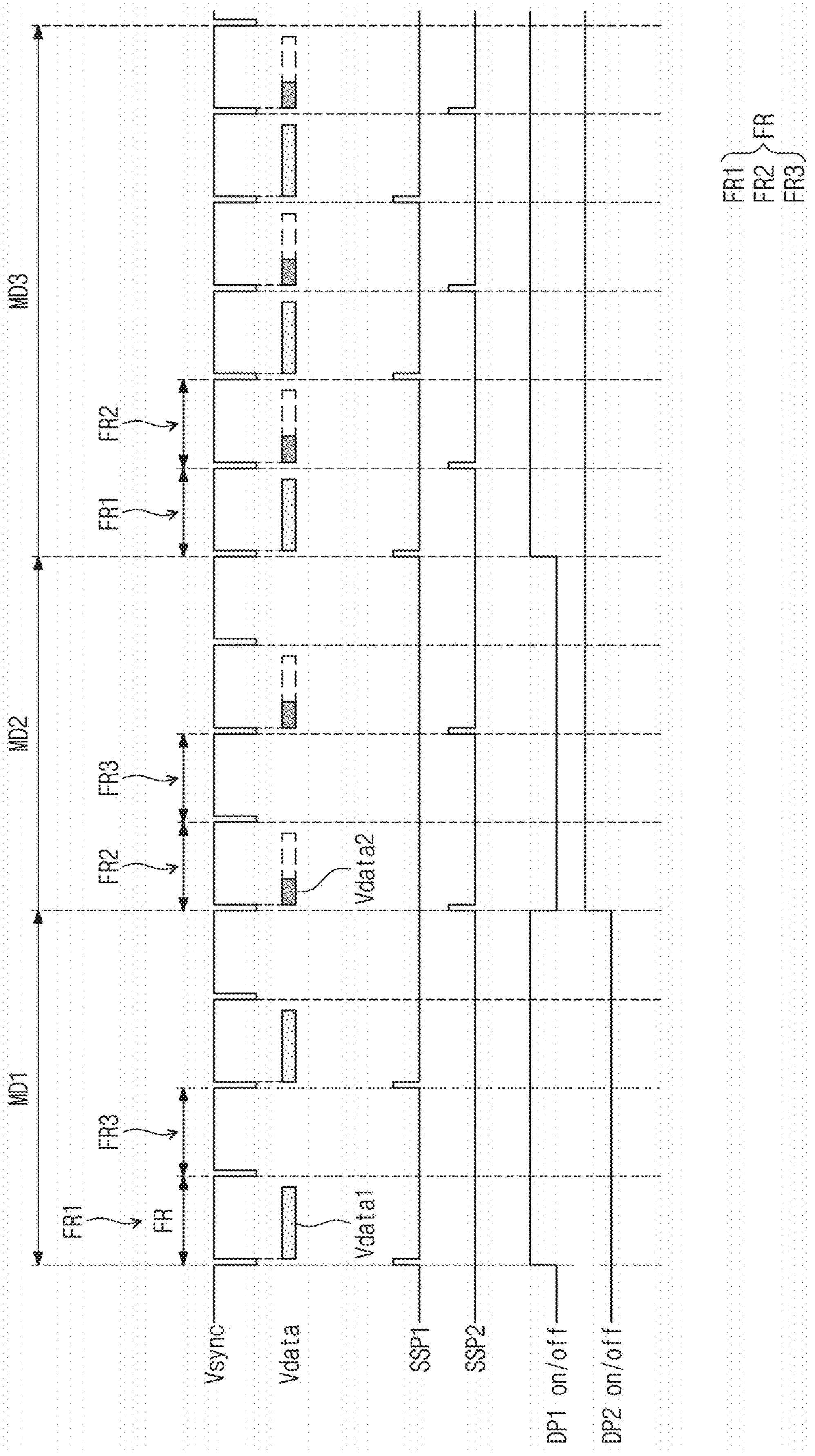
FIG. 8 is a waveform diagram for describing an operation of a display device according to an embodiment of the present disclosure.

FIG. 8 is a waveform diagram for describing an operation of a display device according to an embodiment of the present disclosure.

Referring to FIGS. 7 and 8, each of the first display panel DP1 and the second display panel DP2 may be driven with a plurality of frames FR.

The plurality of frames FR may include active frames, for example, a first frame FR1 and a second frame FR2, and an inactive frame, for example, a third frame FR3. An operation that the display device 1000 performs during the first frame FR1 may be different from an operation that the display device 1000 performs during the second frame FR2.

The control signal CTRL may include a vertical synchronization signal Vsync. One frame FR may be defined as an interval from a falling edge of the vertical synchronization signal Vsync to a next falling edge thereof. However, this is an example, and the definition of the one frame FR according to an embodiment of the present disclosure is not limited thereto. For example, one frame FR may be defined as an interval from a rising edge of the vertical synchronization signal Vsync to a next rising edge thereof.

The drive controller TC may control the first scan start signal SSP1 and the second scan start signal SSP2 in units of frames FR. For example, the drive controller TC may solely provide each of the first scan start signal SSP1 and the second scan start signal SSP2, may alternately provide the first scan start signal SSP1 and the second scan start signal SSP2, or may not provide the first scan start signal SSP1 and the second scan start signal SSP2.

The voltage generator PMIC may provide voltages which drive the first display panel DP1 and the second display panel DP2 based on the voltage control signal VCS. The voltage control signal VCS may include a first on/off signal DP1 on/off and a second on/off signal DP2 on/off. The voltage generator PMIC may control a voltage of the first display panel DP1 and/or the second display panel DP2 in units of frames FR.

When the first on/off signal DP1 on/off is at an active level, the first driving voltage ELVDD1 and the first power supply voltage ELVSS1 may be provided to the first display panel DP1. In this case, the first display panel DP1 may be in an on state. For example, the active level of the first on/off signal DP1 on/off may be a high level.

When the first on/off signal DP1 on/off is at an inactive level, the first driving voltage ELVDD1 and the first power supply voltage ELVSS1 may not be provided to the first display panel DP1. In this case, the first display panel DP1 may be in an off state. For example, the inactive level of the first on/off signal DP1 on/off may be a low level.

When the second on/off signal DP2 on/off is at an active level, the second driving voltage ELVDD2 and the second power supply voltage ELVSS2 may be provided to the second display panel DP2. In this case, the second display panel DP2 may be in an on state. For example, the active level of the second on/off signal DP2 on/off may be the high level.

When the second on/off signal DP2 on/off is at an inactive level, the second driving voltage ELVDD2 and the second power supply voltage ELVSS2 may not be provided to the second display panel DP2. In this case, the second display panel DP2 may be in an off state. For example, the inactive level of the second on/off signal DP2 on/off may be the low level.

The data driver DC may output the data signal Vdata to the plurality of first data lines DL11 and DL12 to DL1*m*. The data signal Vdata may include the first data signal Vdata1 and the second data signal Vdata2. The data driver DC may control the first data signal Vdata1 and/or the second data signal Vdata2 in units of frames FR. For example, the data driver DC may solely provide each of the first data signal Vdata1 and the second data signal Vdata2, may alternately provide the first data signal Vdata1 and the second data signal Vdata2, or may not provide the first data signal Vdata1 and the second data signal Vdata2.

The timing controller embedded driver TED according to an embodiment of the present disclosure may drive the first display panel DP1 and the second display panel DP2 in one of a first mode MD1, a second mode MD2, and a third mode MD3.

The first mode MD1 may be a mode in which the first on/off signal DP1 on/off is at the active level and the second on/off signal DP2 on/off is at the inactive level. That is, the first mode MD1 may be referred to as a "sole driving mode of the first display panel DP1."

In the first mode MD1, the first display panel DP1 may be turned on, the second display panel DP2 may be turned off, and the timing controller embedded driver TED may drive at least one frame FR among the plurality of frames FR of the first display panel DP1 during the first frame FR1. The timing controller embedded driver TED may further drive another frame FR among the plurality of frames FR of the first display panel DP1 as the third frame FR3.

The first frame FR1 may be a frame that is used to drive the first display panel DP1.

During the first frame FR1, the first scan start signal SSP1 may rise. The first scan driver SD1 may output the first scan signal to the first display panel DP1. During the first frame FR1, the data driver DC may output the first data signal Vdata1 to the plurality of first data lines DL11 and DL12 to DL1*m*. The first display panel DP1 may be driven based on the first data signal Vdata1 and the first scan signal. That is, the timing controller embedded driver TED may output the first data signal Vdata1 corresponding to the first display panel DP1 to the plurality of first data lines DL11 and DL12 to DL1*m* during the first frame FR1.

In this case, the first data signal Vdata1 may also be provided to the second display panel DP2 through the plurality of second data lines DL21 and DL22 to DL2*m*. However, because the second scan start signal SSP2 does not rise during the first frame FR1, the second scan signal may not be provided to the second display panel DP2. This may mean that the first data signal Vdata1 is not used to drive the second display panel DP2.

The third frame FR3 may be a frame in which the first display panel DP1 and the second display panel DP2 are not driven. The third frame FR3 may be referred to as a "blank period". A driving frequency of the first display panel DP1 or the second display panel DP2 may be controlled by using the third frame FR3.

When one frame FR has 120 Hz (hertz) and the first frame FR1 which is an active frame and the third frame FR3 which is an inactive frame are alternately provided during the first mode MD1, the driving frequency of the first display panel DP1 may be 60 Hz. However, this is provided as an example, and the driving frequency of the first display panel DP1 according to an embodiment of the present disclosure may be controlled depending on a period where the active frame, for example, the first frame FR1, is provided. For example, when the inactive frame is not disposed in the first mode MD1, the driving frequency of the first display panel DP1 may be 120 Hz.

Also, when one frame FR has 240 Hz and the active frame and the inactive frame are alternately provided during the first mode MD1, the driving frequency of the first display panel DP1 may be 120 Hz. Also, when the inactive frame is not disposed in the first mode MD1, the driving frequency of the first display panel DP1 may be 240 Hz.

The second mode MD2 may be a mode in which the first on/off signal DP1 on/off is at the inactive level and the second on/off signal DP2 on/off is at the active level. That is, the second mode MD2 may be referred to as a "sole driving mode of the second display panel DP2."

In the second mode MD2, the first display panel DP1 may be turned off, the second display panel DP2 may be turned on, and the timing controller embedded driver TED may drive at least one frame FR among the plurality of frames FR of the second display panel DP2 as the second frame FR2. The timing controller embedded driver TED may further drive another frame FR among the plurality of frames FR of the second display panel DP2 as the third frame FR3 which is an inactive frame.

The second frame FR2 may be a frame that is used to drive the second display panel DP2.

During the second frame FR2, the second scan start signal SSP2 may rise. The second scan driver SD2 may output the second scan signal to the second display panel DP2. The second scan signal may be different from the first scan signal. For example, the rising time of the first scan signal and the second scan signal may be different from each other. During the second frame FR2, the data driver DC may output the second data signal Vdata2 to the plurality of second data lines DL21 and DL22 to DL2*m*. The second display panel DP2 may be driven based on the second data signal Vdata2 and the second scan signal. That is, the timing controller embedded driver TED may output the second data signal Vdata2 corresponding to the second display panel DP2 to the plurality of second plurality data lines DL21 and DL22 to DL2*m* during the second frame FR2.

In this case, the second data signal Vdata2 may also be provided to the first display panel DP1 through the plurality of first data lines DL11 and DL12 to DL1*m*. However, because the first scan start signal SSP1 does not rise during the second frame FR2, the first scan signal may not be provided to the first display panel DP1. This may mean that the second data signal Vdata2 is not used to drive the first display panel DP1.

The first scan start signal SSP1 and the second scan start signal SSP2 may not rise together during one frame FR. That is, the first scan start signal SSP1 and the second scan start signal SSP2 may not overlap each other.

When one frame FR has 120 Hz (hertz) and the active frame, for example, the second frame FR2, and the inactive frame, for example, the third frame FR3, are alternately provided during the second mode MD2, the driving frequency of the second display panel DP2 may be 60 Hz. However, this is provided as an example, and the driving frequency of the second display panel DP2 according to an embodiment of the present disclosure may be controlled depending on an active frame, for example, the second frame FR2 is provided. For example, when the inactive frame is not disposed in the second mode MD2, the driving frequency of the second display panel DP2 may be 120 Hz.

Also, when one frame FR has 240 Hz and the active frame, for example, the second frame FR2, and the inactive frame, for example, the third frame FR3, are alternately provided during the second mode MD2, the driving frequency of the second display panel DP2 may be 120 Hz. Also, when the inactive frame is not disposed in the second mode MD2, the driving frequency of the second display panel DP2 may be 240 Hz.

The third mode MD3 may be a mode in which the first on/off signal DP1 on/off is at the active level and the second on/off signal DP2 on/off is at the active level. That is, the third mode MD3 may be referred to as a "simultaneous driving mode of the first display panel DP1 and the second display panel DP2."

In the third mode MD3, the first display panel DP1 may be turned on, the second display panel DP2 may also be turned on, and the timing controller embedded driver TED may drive the first display panel DP1 and the second display panel DP2 with the first frame FR1 and the second frame FR2, respectively. The timing controller embedded driver TED may further drive the plurality of frames FR of the first display panel DP1 and the second display panel DP2 as the third frame FR3.

When one frame FR has 120 Hz (hertz) and the first frame FR1 and the second frame FR2 are alternately provided during the third mode MD3, the driving frequency of the first display panel DP1 may be 60 Hz, and the driving frequency of the second display panel DP2 may be 60 Hz. In this case, the first frame FR1 and the second frame FR2 may be alternately provided, and the first display panel DP1 and the second display panel DP2 may have the same driving frequency.

Also, when one frame FR has 240 Hz and the first frame FR1 and the second frame FR2 are alternately provided during the third mode MD3, the driving frequency of the first display panel DP1 may be 120 Hz, and the driving frequency of the second display panel DP2 may be 120 Hz.

Unlike the present disclosure, a first display panel may be driven by a first display driving circuit, and a second display panel may be driven by a second display driving circuit which is different from the first display driving circuit. However, according to the present disclosure, the first display panel DP1 and the second display panel DP2 may be driven by one timing controller embedded driver TED. That is, the display device 1000 may easily drive the plurality of display panels DP1 and DP2 by using one timing controller embedded driver TED. Accordingly, the inner space of the display device 1000 may be saved.

Figure 9:
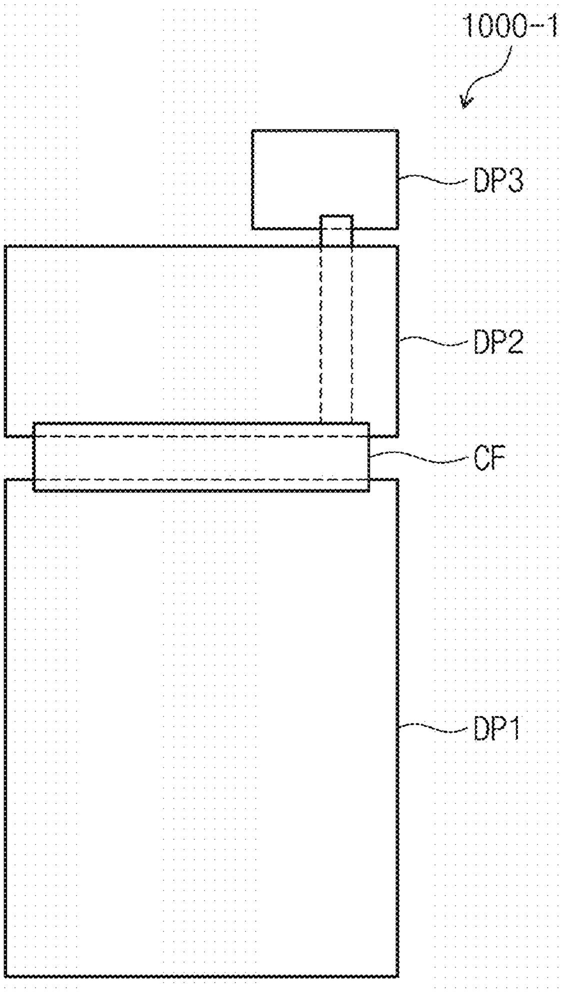
FIG. 9 is a diagram for describing a schematic structure of a display device according to an embodiment of the present disclosure.
Figure 10:
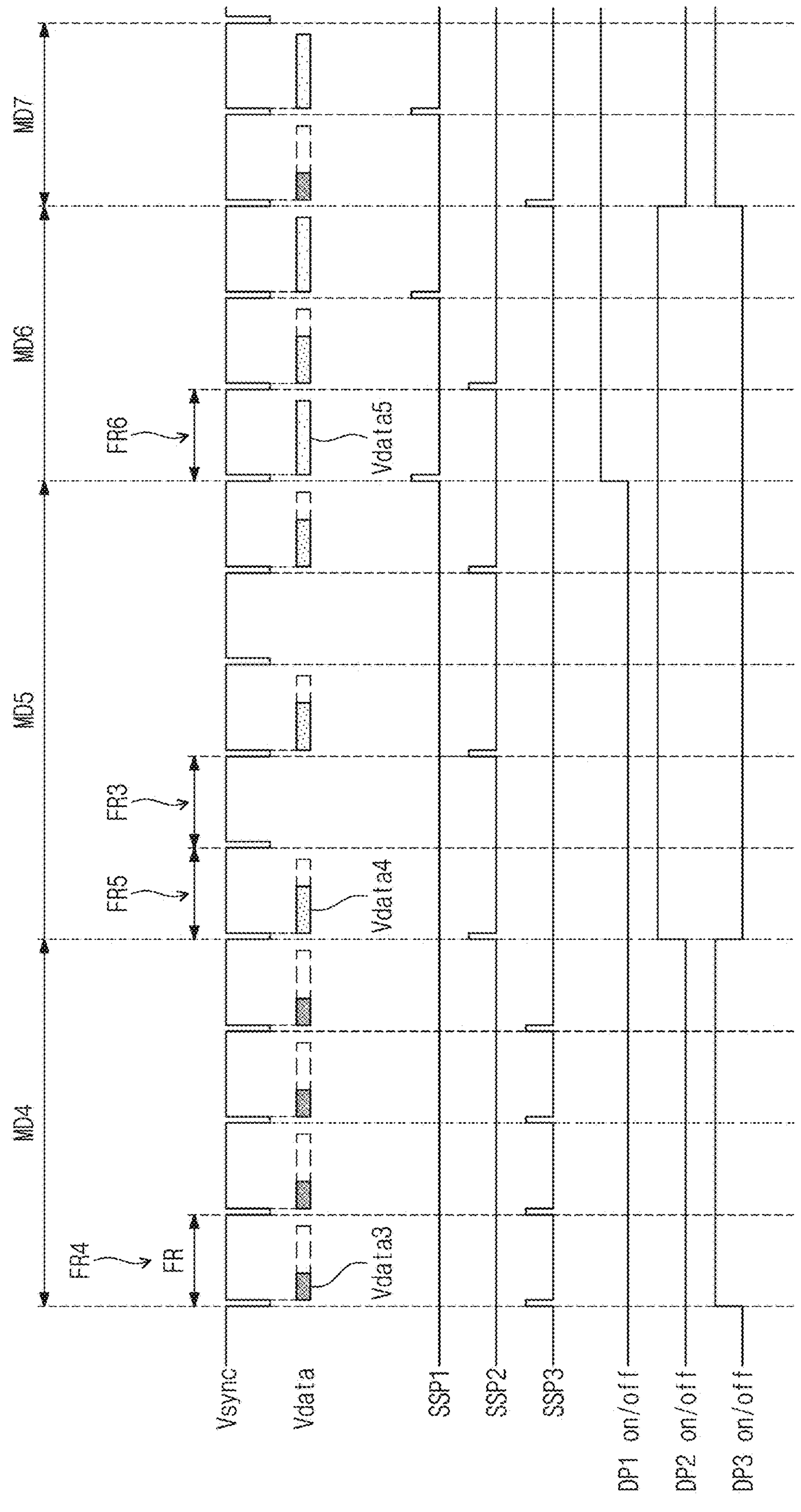
FIG. 10 is a waveform diagram for describing an operation of a display device according to an embodiment of the present disclosure.

FIG. 9 is a diagram for describing a schematic structure of a display device according to an embodiment of the present disclosure. FIG. 10 is a waveform diagram for describing an operation of a display device according to an embodiment of the present disclosure. In the description of FIGS. 9 and 10, the components that are described with reference to FIGS. 5 and 8 are marked by the same reference numerals/signs, and thus, additional description will be omitted to avoid redundancy.

Referring to FIGS. 7, 9, and 10, a display device 1000-1 may include the first display panel DP1, the second display panel DP2, and a third display panel DP3.

The second display surface RS (refer to FIG. 2) may be provided in plurality. The second display panel DP2 may overlap one of the plurality of second display surfaces RS (refer to FIG. 2). The third display panel DP3 may overlap another of the plurality of second display surfaces RS (refer to FIG. 3).

The data driver DC outputs the data signal Vdata to the plurality of signal transfer lines SL1 and SL2 to SLm. The data signal Vdata may include a third data signal Vdata3, a fourth data signal Vdata4, and a fifth data signal Vdata5.

The data driver DC may provide the third data signal Vdata3, the fourth data signal Vdata4, and the fifth data signal Vdata5 through the plurality of first data lines DL11 and DL12 to DL1*m*, the plurality of second data lines DL21 and DL22 to DL2*m*, and a plurality of third data lines electrically connected to third display panel DP3. That is, the first display panel DP1, the second display panel DP2, and the third display panel DP3 may share the plurality of signal transfer lines SL1 and SL2 to SLm, and the third data signal Vdata3, the fourth data signal Vdata4, and the fifth data signal Vdata5 may be respectively provided to the first display panel DP1, the second display panel DP2, and the third display panel DP3 through the plurality of signal transfer lines SL1 and SL2 to SLm.

The plurality of signal transfer lines SL1 and SL2 to SLm may be electrically respectively connected to the plurality of first data lines DL11 and DL12 to DL1*m*, may be electrically respectively connected to the plurality of second data lines DL21 and DL22 to DL2*m*, and may be electrically respectively connected to the plurality of third data lines. That is, the plurality of signal transfer lines SL1 and SL2 to SLm are connected to the plurality of first data lines DL11 and DL12 to DL1*m*, the plurality of second data lines DL21 and DL22 to DL2*m*, and the plurality of third data lines.

The third display panel DP3 may include a third scan driver, a plurality of third scan lines, a plurality of third data lines, and a plurality of third pixels. The third pixels may be different from the first pixels PX1 and the second pixels PX2.

The third display panel DP3 may be disposed to be spaced from the first display panel DP1 and the second display panel DP2. The area of the second display panel DP2 may be wider than the area of the third display panel DP3.

The timing controller embedded driver TED and the voltage generator PMIC may be mounted on the flexible circuit board CF. The timing controller embedded driver TED may further drive the third display panel DP3. In an embodiment of the present disclosure, the voltage generator PMIC may generate a third driving voltage and a third power supply voltage necessary for an operation of the third display panel DP3 and may further control an on/off state of the third display panel DP3. As the flexible circuit board CF is bent, the first display panel DP1 may face the second display panel DP2 and the third display panel DP3.

Each of the first display panel DP1, the second display panel DP2, and the third display panel DP3 may operate based on the plurality of frames FR.

The plurality of frames FR may include the third frame FR3, a fourth frame FR4, a fifth frame FR5, and a sixth frame FR6. Operations that the display device 1000-1 perform during the fourth to sixth frames FR4 to FR6, respectively, may be different from each other.

The drive controller TC may further control a third scan start signal SSP3 in units of frames FR. For example, the drive controller TC may solely provide each of the first scan start signal SSP1, the second scan start signal SSP2, and the third scan start signal SSP3, may alternately provide the first scan start signal SSP1, the second scan start signal SSP2, and the third scan start signal SSP3, or may not provide the first scan start signal SSP1, the second scan start signal SSP2, and the third scan start signal SSP3.

The voltage generator PMIC may further provide voltages which drives the third display panel DP3 based on the voltage control signal VCS. The voltage control signal VCS may further include a third on/off signal DP3 on/off. The voltage generator PMIC may control a voltage of the first display panel DP1, the second display panel DP2, and/or the third display panel DP3 in units of frames FR.

When the third on/off signal DP3 on/off is at an active level, the third driving voltage and the third power supply voltage may be provided to the third display panel DP3. In this case, the third display panel DP3 may be in an on state. For example, the active level of the third on/off signal DP3 on/off may be the high level.

When the third on/off signal DP3 on/off is at the inactive level, the third driving voltage and the third power supply voltage may not be provided to the third display panel DP3. In this case, the third display panel DP3 may be in an off state. For example, the inactive level of the third on/off signal DP3 on/off may be the low level.

The data driver DC may output the data signal Vdata to the plurality of signal transfer lines SL1 and SL2 to SLm. The data signal Vdata may further include the third data signal Vdata3, the fourth data signal Vdata4, and the fifth data signal Vdata5.

The data driver DC may control the third data signal Vdata3, the fourth data signal Vdata4, and/or the fifth data signal Vdata5 in units of frames FR. For example, the data driver DC may solely provide each of the third data signal Vdata3, the fourth data signal Vdata4, and/or the fifth data signal Vdata5, may alternately provide the third data signal Vdata3, the fourth data signal Vdata4, and/or the fifth data signal Vdata5, or may not provide the third data signal Vdata3, the fourth data signal Vdata4, and/or the fifth data signal Vdata5.

The timing controller embedded driver TED according to an embodiment of the present disclosure may drive the first display panel DP1, the second display panel DP2, and the third display panel DP3 in one of a fourth mode MD4, a fifth mode MD5, a sixth mode MD6, and a seventh mode MD7.

The fourth mode MD4 may be a mode in which the third on/off signal DP3 on/off is at the active level and the first on/off signal DP1 on/off and the second on/off signal DP2 on/off are at the inactive level. That is, the fourth mode MD4 may be referred to as a “sole driving mode of the third display panel DP3.”

In the fourth mode MD4, the third display panel DP3 may be turned on, the first display panel DP1 and the second display panel DP2 may be turned off, and the timing controller embedded driver TED may drive at least one frame FR among the plurality of frames FR of the third display panel DP3 during the fourth frame FR4. The fourth frame FR4 is driven during the fourth mode MD4 as illustrated in FIG. 10, but the present disclosure is not limited thereto. For example, in the fourth mode MD4, the timing controller embedded driver TED may further drive another frame FR among the plurality of frames FR of the third display panel DP3 as the inactive frame, for example, the third frame FR3.

The fourth frame FR4 may be a frame that is used to drive the third display panel DP3.

During the fourth frame FR4, the third scan start signal SSP3 may rise. The third scan driver may output the third scan signal to the third display panel DP3. During the fourth frame FR4, the data driver DC may output the third data signal Vdata3 to the plurality of third data lines. The third display panel DP3 may be driven based on the third data signal Vdata3 and the third scan signal. That is, the timing controller embedded driver TED may output the third data signal Vdata3 corresponding to the third display panel DP3 to the plurality of third data lines during the fourth frame FR4.

In this case, the third data signal Vdata3 may also be provided to each of the first display panel DP1 and the second display panel DP2 through the plurality of first data lines DL11 and DL12 to DL1*m* and the plurality of second data lines DL21 and DL22 to DL2*m*. However, during the fourth frame FR4, because the first and second scan start signals SSP1 and SSP2 do not rise, the first and second scan signals may not be provided to the first and second display panels DP1 and DP2, respectively. This means that the third data signal Vdata3 is not used to drive the first display panel DP1 and the second display panel DP2.

A driving frequency of the first display panel DP1, the second display panel DP2, or the third display panel DP3 may be controlled by using the inactive frame, for example, the third frame FR3.

When the fourth frame FR4 does not include the inactive frame, the driving frequency of the third display panel DP3 may be 120 Hz. However, this is provided as an example, and the driving frequency of the third display panel DP3 according to an embodiment of the present disclosure may be controlled depending on a period where the fourth frame FR4 is provided. For example, when one frame FR has 120 Hz (hertz) and the fourth frame FR4 and the inactive frame, for example, the third frame FR3, are alternately provided during the fourth mode MD4, the driving frequency of the third display panel DP3 may be 60 Hz.

The fifth frame FR5 may be a frame that is used to drive the second display panel DP2.

During the fifth frame FR5, the second scan start signal SSP2 may rise. The second scan driver SD2 may output the second scan signal to the second display panel DP2. During the fifth frame FR5, the data driver DC may output the fourth data signal Vdata4 to the plurality of second data lines DL21 and DL22 to DL2*m*. The second display panel DP2 may be driven based on the fourth data signal Vdata4 and the second scan signal. That is, the timing controller embedded driver TED may output the fourth data signal Vdata4 corresponding to the second display panel DP2 to the plurality of second data lines DL21 to DL2*m* during the fifth frame FR5. The fifth mode MD5 may be a mode in which the first on/off signal DP1 on/off and the third on/off signal DP3 are at the inactive level and the second on/off signal DP2 on/off is at the active level. That is, the fifth mode MD5 may be referred to as a “sole driving mode of the second display panel DP2.”

In this case, the fourth data signal Vdata4 may also be provided to the first display panel DP1 and the third display panel DP3 through the plurality of first data lines DL11 and DL12 to DL1*m* and the plurality of third data lines. However, during the fifth frame FR5, because the first and third scan start signals SSP1 and SSP3 do not rise, the first and third scan signals may not be provided to the first and third display panels DP1 and DP3, respectively. This means that the fourth data signal Vdata4 is not used to drive the first display panel DP1 and the third display panel DP3.

The first scan start signal SSP1, the second scan start signal SSP2, and the third scan start signal SSP3 may not simultaneously rise during one frame FR. That is, the first scan start signal SSP1, the second scan start signal SSP2, and the third scan start signal SSP3 may not overlap each other.

When one frame FR has 120 Hz (hertz) and the fifth frame FR5 and the inactive frame, for example, the third frame FR3, are alternately provided during the fifth mode MD5, the driving frequency of the second display panel DP2 may be 60 Hz. However, this is provided as an example, and the driving frequency of the second display panel DP2 according to an embodiment of the present disclosure may be controlled depending on a period where the second frame FR2 is provided. For example, when the fifth frame FR5 does not include the inactive frame during the fifth mode MD5, the driving frequency of the second display panel DP2 may be 120 Hz.

The sixth mode MD6 may be a mode in which the first on/off signal DP1 on/off is at the active level, the second on/off signal DP2 on/off is at the active level, and the third on/off signal DP3 on/off is at the inactive level. That is, the sixth mode MD6 may be referred to as a “simultaneous driving mode of the first display panel DP1 and the second display panel DP2”.

In the sixth mode MD6, the first display panel DP1 may be turned on, the second display panel DP2 may be turned on, and the third display panel DP3 may be turned off. The timing controller embedded driver TED may drive the first display panel DP1 and the second display panel DP2 with the sixth frame FR6 and the fifth frame FR5, respectively. The timing controller embedded driver TED may further drive the plurality of frames FR of the first display panel DP1 and the second display panel DP2 as the inactive frame, for example, the third frame FR3.

The sixth frame FR6 may be a frame that is used to drive the first display panel DP1.

During the sixth frame FR6, the first scan start signal SSP1 may rise. The first scan driver SD1 may output the first scan signal to the first display panel DP1. During the sixth frame FR6, the data driver DC may output the fifth data signal Vdata5 to the plurality of first data lines DL11 to DL1*m*. The first display panel DP1 may be driven based on the fifth data signal Vdata5 and the first scan signal. That is, the timing controller embedded driver TED may output the fifth data signal Vdata5 corresponding to the first display panel DP1 to the plurality of first data lines DL11 and DL12 to DL1*m* during the sixth frame FR6.

In this case, the fifth data signal Vdata5 may also be provided to the second display panel DP2 and the third display panel DP3 through the plurality of second data lines DL21 and DL22 to DL2*m* and the plurality of third data lines. However, during the sixth frame FR6, because the second and third scan start signals SSP2 and SSP3 do not rise, the second and third scan signals may not be provided to the second and third display panels DP2 and DP3, respectively. This means that the fifth data signal Vdata5 is not used to drive the second display panel DP2 and the third display panel DP3.

When one frame FR has 120 Hz (hertz) and the fifth frame FR5 and the sixth frame FR6 are alternately provided during the sixth mode MD6, the driving frequency of the first display panel DP1 may be 60 Hz, and the driving frequency of the second display panel DP2 may be 60 Hz. In this case, the fifth frame FR5 and the sixth frame FR6 may be alternately provided, and the first display panel DP1 and the second display panel DP2 may have the same driving frequency.

The seventh mode MD7 may be a mode in which the first on/off signal DP1 on/off and the third on/off signal DP3 on/off are at the active and the second on/off signal DP2 on/off is at the inactive level. That is, the seventh mode MD7 may be referred to as a "simultaneous driving mode of the first display panel DP1 and the third display panel DP3".

In the seventh mode MD7, the first display panel DP1 and the third display panel DP3 may be turned on, and the second display panel DP2 may be turned off. The timing controller embedded driver TED may drive the first display panel DP1 and the third display panel DP3 with the fourth frame FR4 and the sixth frame FR6, respectively. The timing controller embedded driver TED may further drive the plurality of frames FR of the first display panel DP1 and the second display panel DP2 as the third frame FR3.

When one frame FR has 120 Hz (hertz) and the fourth frame FR4 and the sixth frame FR6 are alternately provided during the seventh mode MD7, the driving frequency of the first display panel DP1 may be 60 Hz, and the driving frequency of the third display panel DP3 may be 60 Hz. In this case, the fourth frame FR4 and the sixth frame FR6 may be alternately provided, and the first display panel DP1 and the third display panel DP3 may have the same driving frequency.

Unlike the present disclosure, a first display panel may be driven by a first display driving circuit, a second display panel may be driven by a second display driving circuit, and a third display panel may be driven by a third display driving circuit. However, according to the present disclosure, the first display panel DP1, the second display panel DP2, and the third display panel DP3 may be driven by one timing controller embedded driver TED. That is, the display device 1000-1 may easily drive the plurality of display panels DP1, DP2, and DP3 by using one timing controller embedded driver TED. Accordingly, the inner space of the display device 1000 may be saved.

According to the above description, a first display panel and a second display panel may be driven by one timing controller embedded driver. That is, a display device may easily drive a plurality of display panels by using one timing controller embedded driver. Accordingly, an inner space of the display device may be saved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a first display panel including a first pixel and a first data line, and configured to be driven with a plurality of frames;

a second display panel including a second pixel and a second data line, spaced apart from the first display panel, and configured to be driven with the plurality of frames;

a driving controller and a data driver configured to drive the first display panel and the second display panel and to control the plurality of frames; and a signal transfer line electrically connected to the first data line, the second data line, and the data driver, wherein the plurality of frames include a first frame and a second frame different from the first frame, wherein, during the first frame, the data driver outputs a first data signal which drives the first display panel to the signal transfer line, and wherein, during the second frame, the data driver outputs a second data signal which drives the second display panel to the signal transfer line.

2. The display device of claim 1, wherein the first display panel and the second display panel face each other.

3. The display device of claim 1, wherein the driving controller and the data driver is disposed between the first display panel and the second display panel.

4. The display device of claim 1, further comprising a flexible circuit board electrically connected to the first display panel and the second display panel, wherein the driving controller and the data driver are disposed on the flexible circuit board.

5. The display device of claim 1, wherein the first display panel includes a first scan driver outputting a first scan signal during the first frame, and wherein the second display panel includes a second scan driver outputting a second scan signal different from the first scan signal during the second frame.

6. The display device of claim 5, wherein the first display panel provides the first data signal to the first pixel, wherein the first pixel emits a light based on the first scan signal and the first data signal, wherein the second display panel provides the second data signal to the second pixel, and wherein the second pixel emits a light based on the second scan signal and the second data signal.

7. The display device of claim 6, wherein the first scan driver includes a plurality of first shift registers which sequentially operate, wherein the second scan driver includes a plurality of second shift registers which sequentially operate, and wherein the driving controller provides a first scan start signal to a 1-1st shift register among the plurality of first shift registers and provides a second scan start signal different from the first scan start signal to a 1-2nd shift register among the plurality of second shift registers.

8. The display device of claim 7, wherein the first scan driver outputs the first scan signal based on the first scan start signal, and wherein the second scan driver outputs the second scan signal based on the second scan start signal.

9. The display device of claim 7, wherein the first scan start signal and the second scan start signal do not overlap each other.

10. The display device of claim 1, further comprising:

a voltage generator configured to receive a voltage control signal from the driving controller and to control an on/off state of each of the first display panel and the second display panel based on the voltage control signal.

11. The display device of claim 1, wherein the driving controller drives the first display panel and the second display panel in one of a first mode, a second mode, and a third mode, and wherein, in the first mode, the first display panel is turned on, the second display panel is turned off, and wherein the driving controller drives at least one frame among the plurality of frames as the first frame.

12. The display device of claim 11, wherein, in the second mode, the first display panel is turned off, the second display panel is turned on, and the driving controller drives at least one frame among the plurality of frames as the second frame.

13. The display device of claim 11, wherein, in the third mode, the first display panel is turned on, the second display panel is turned on, and the driving controller drives the first display panel and the second display panel with the first frame and the second frame, respectively, and wherein the first frame and the second frame are alternately provided.

14. The display device of claim 13, wherein, in the third mode, a driving frequency of the first display panel is identical to a driving frequency of the second display panel.

15. The display device of claim 1, wherein the first data signal and the second data signal are respectively provided to the first display panel and the second display panel through the signal transfer line.

16. The display device of claim 1, wherein an area of the first display panel is wider than an area of the second display panel.

17. The display device of claim 1, further comprising:

a third display panel including a third pixel and a third data line, spaced apart from the first display panel and the second display panel, and configured to be driven with the plurality of frames, wherein the driving controller further drives the third display panel, wherein the signal transfer line is further electrically connected to the third data line, wherein the plurality of frames further include a third frame different from the first frame and the second frame, and wherein, during the third frame, the data driver outputs a third data signal driving the third display panel to the signal transfer line.

18. The display device of claim 17, wherein the first display panel and the third display panel face each other.

19. The display device of claim 17, wherein the first data signal, the second data signal, and the third data signal are respectively provided to the first display panel, the second display panel, and the third display panel through the signal transfer line.

20. The display device of claim 17, wherein an area of the second display panel is wider than an area of the third display panel.

* * * * *